May 27, 1975 C. R. OLSEN Re. 28,434

ACTUATOR

Original Filed April 25, 1967

CHARLES R. OLSEN
INVENTOR.

KENDRICK, SUBKOW and STOLZY
BY
Donald Stolzy
ATTORNEY

United States Patent

Re. 28,434
Reissued May 27, 1975

28,434

ACTUATOR

Charles R. Olsen, 112 Sherbrooke Ave., Hartford, Conn. 06106

Original No. 3,483,695, dated Dec. 16, 1969, Ser. No. 633,459, Apr. 25, 1967. Application for reissue Dec. 13, 1971, Ser. No. 207,015
Int. Cl. B67d *5/42;* F01b *29/08*
U.S. Cl. 60—632 1 Claim

Matter enclosed in heavy brackets [ ] appears in the original patent but forms no part of this reissue specification; matter printed in italics indicates the additions made by reissue.

ABSTRACT OF THE DISCLOSURE

Apparatus for supplying a fluid under pressure to actuate hydraulic or pneumatic motive power means, said apparatus comprising two metal enclosures and a squib in one enclosure to squeeze out fluid in the other enclosure when the squib is exploded or fired by expanding or collapsing one of the enclosures.

BACKGROUND OF THE INVENTION

This invention relates to means for supplying a fluid under pressure, and more particularly to a device for operating hydraulic and pneumatic equipment.

Explosive type actuators of the prior art are used in aerospace applications. In general, fluid is supplied to hydraulic or pneumatic equipment from a cylinder having a piston therein. The fluid is contained in the cylinder on one side of the piston. An explosive charge is then exploded in the cylinder on the other side of the piston to drive the fluid out of the cylinder. In such a case an exceptionally good seal must be provided between the piston and the cylinder wall to prevent contamination of the hydraulic or pneumatic fluid. Due to the unusually high pressure which is created by the explosive decomposition or force, it is practically impossible to produce a good fluid tight seal.

One shot hydraulic actuators also have employed rubber bladders. These too are extremely difficult to seal.

Both piston type and bladder type actuators also require considerable maintenance. Due to the maintenance involved, further seals must be provided at access ports.

SUMMARY OF THE INVENTION

In accordance with the device of the present invention, the above-described and other disadvantages of the prior art are overcome by providing two sealed enclosures and an explosive charge in one enclosure to collapse the other enclosure by explosion thereof. It is thus possible to avoid a sliding seal required around the piston of the prior art. A nearly perfect seal may thus be provided. The device of the present invention thus may be thrown away after it is used. It will not therefore require any maintenance.

The above-described and other advantages of the present invention will be better understood from the following description when considered in connection with the accompanying drawings.

DESCRIPTION OF THE PREFERRED EMBODIMENTS

Figure 1:
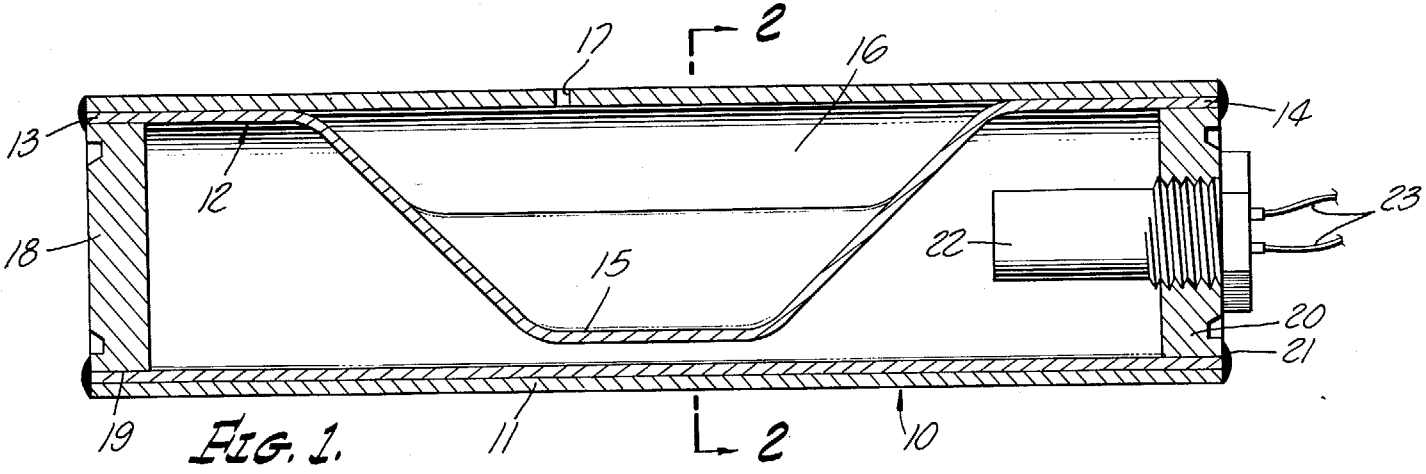
FIG. 1 is a longitudinal sectional view of one embodiment of the present invention.

In the drawing in FIG. 1, an explosive actuator or accumulator is indicated at 10. The accumulator 10 comprises an outer metal or suitable non-metallic tube 11 which will not take any substantial permanent deformation upon the operation of the device. An inner tube 12 is welded or otherwise sealed at its ends 13 and 14 to tube 11. Tube 12 is indented at 15. Tubes 11 and 12 thus define a space 16 therebetween. Space 16 is filled with oil, air or other fluid. This fluid is supplied to hydraulic or pneumatic equipment through a port 17 in the wall of tube 11. A plug 18 is secured to and seals tube 12 at 19. A plug 20 is affixed to tube 12 at 21 and thereby seals tube 12 at its right end as viewed in FIG. 1.

A squib or primer 22 is fixed inside plug 20. Squib 22 is fired or exploded by supplying an electrical current to leads 23 through plug 20.

Figure 3:
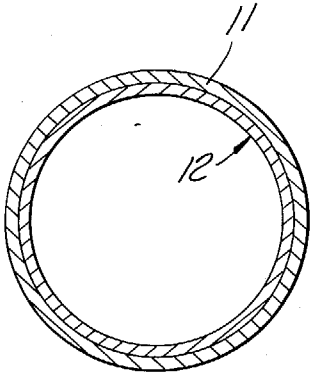
FIG. 3 is a sectional view similar to FIG. 2 after the actuator has been operated.
Figure 2:
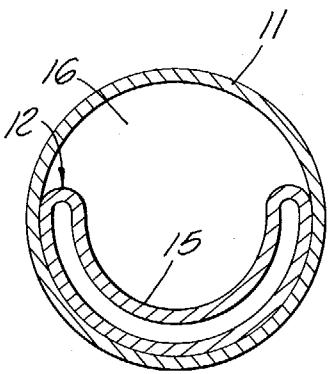
FIG. 2 is a transverse sectional view taken on the line 2—2 shown in FIG. 1.

Normally, tube 12 takes the shape as shown in FIG. 2. When squib 22 is fired or exploded, tube 12 expands to the position shown in FIG. 3. The fluid in space 16 is then driven out of port 17.

Note will be taken that tube 12 may be made slightly smaller than tube 11. Both tubes may be cylindrical initially and an explosive charge may be located between the two. Port 17 may then be closed and a port provided in plug 18. In that case, tube 12 would collapse to drive the fluid inside tube 12 through a port in plug 18.

The embodiment shown in FIG. 1 may be varied. Tube 12, alternatively, may be fluted and may have a star-shaped cross section of two, three, four or more points.

In accordance with the present invention, the accumulator of the present invention may be converted to a high velocity fire arm. The fluid supplied by the accumulator may be a light gas, such as [hydrogren] *hydrogen* or helium. It is thus possible to fire a metal or other projectile or white phosphorous at high speed. Moreover, instead of firing a projectile, white phosphorous, plasticized white phosphorous or other fluid chemical agents may be expelled directly as the working fluid.

If desired, the port 17 or any other equivalent port may be sealed with a rupturable diaphragm. However, on diaphragm is necessarily needed.

If desired, a heat shield may be provided inside or outside tube 12. Note will be taken that port 17 may be located anywhere. Plug 18 can be omitted and the fluted section of the inner tube 12 can extend all the way to the end of the inner tube. In this construction, the fluted end of the tube 12 can be sealed in the fluted condition, thereby assuring that the working fluid passes the sealed end which is prevented from entirely unfurling to a cylindrical cross section form. Also, the end of the outer tube 11 becomes a port 17. This form of the device of the invention is particularly advantageous where a relatively long and slender storage space is available or, if that is not the case, the long slender device can be bent to suit the available space by utilizing conventional tube bending means. The squib or primer 22 may also be located adjacent or relatively remotely of that depicted in the drawings and the explosive material may, alternatively, be in an integral mass at one particular location or distributed as a relatively thin layer along the side of the inner tube. A satisfactory explosive charge for use with this invention can vary from a very slow burning propellant to a relatively high explosive material such as the material known in the art as Mild Detonating Fuse.

All embodiments of the invention may be disposable.

To increase the efficiency of providing a substantial amount of fluid at high velocity and pressure, it is possible to use a filler of rubber or other material inside space 16. The filler, upon explosive actuation of the device, would fill any portions of the fluid reservoir which would not be completely closed off by explosive deformation of the inner tube 12.

Squib 22 and all of its mounting structure on both sides of plug 20 and the portion thereof extending through plug 20 may be entirely conventional.

From the foregoing, it will be appreciated that no sliding seal is needed as required with piston type explosive actuators of the prior art. By being disposable, the device of the present invention may need no maintenance. The device is also economical to manufacture with a minimum of close tolerances and polished surfaces.

Although a few embodiments of the present invention have been described and illustrated herein, many changes and modifications thereof will of course suggest themselves to those skilled in the art. The present invention should therefore not be limited to the embodiments selected for this disclosure, the true scope of the invention being defined only in the appended claims.

I claim:

[1. In a device for supplying a fluid under pressure, the combination comprising: an outer cylindrical metal tube; an inner cylindrical metal tube telescoped inside of said outer tube, said inner tube being indented and partially collapsed at the center thereof, said tubes thereby defining a first space therebetween, said outer tube having a hole therethrough into said first space, the mutually adjacent ends of said tubes being fixed together to seal off said first space, said inner tube being hollow and thereby defining a second space therein; a first plug fixed to one end of said inner tube to seal off said second space; a second plug fixed to the other end of said inner tube to seal off said second space; a squib fixed to said second plug in said second space; and means fixed to and extending through said second plug for detonating said squib.]

[2. In a device for supplying a fluid under pressure, the combination comprising: an outer cylindrical metal tube; an inner cylindrical metal tube telescoped inside of said outer tube, said inner tube being indented and partially collapsed at the center thereof, said tubes thereby defining a first elongated space therebetween extending longitudinally of said tubes, the mutually adjacent ends of said tubes being fixed together to seal off said first space, said inner tube being hollow and thereby defining a second space therein; a first plug fixed to one end of said inner tube to seal off said second space; a second plug fixed to the other end of said inner tube to seal off said second space; a squib fixed to said second plug in said second space; and means fixed to and extending through said second plug for exploding said squib to progressively expand the partially collapsed center portion of said inner tube in a direction toward the outer tube from said second plug edge of the first space.]

*3. An actuating device for pressurizing a working fluid in a fluid operated device comprising: an outer tubular member having a cylindrical tube wall defining a limited interior volume and capable of withstanding a high internal fluid pressure without substantial permanent deformation; an inner metallic, tubular member extending axially within the outer member and having a diameter at one end corresponding substantially to the inside diameter of the outer tubular member, the inner member also having a deformable, collapsed, fluted wall portion defined by at least one longitudinally extending indentation along a section of the member, the wall portion being collapsed upon itself to substantially reduce the interior volume in the collapsed section and to correspondingly form a substantial fluid receiving storage space in the limited interior volume of the outer tubular member between the outer tubular member and the collapsed wall portion, the inner tubular member also being closed and sealed at one longitudinal end to prevent rupture under high explosive pressurization; a non-rupturing, sealing plug mounted in the other end of the inner tubular member opposite the closed and sealed end to form a closed, non-rupturable and deformable fluid confinement vessel from the indented, sealed inner tubular member, and an explosive squib mounted from the sealing plug in the closed, fluid confinement space defined within the vessel and having squib actuating means exposed on the exterior of the sealing plug, the squib and sealing plug also being in sealing relationship to retain highly pressurized gases resulting from the explosion of the squib in the closed, fluid confinement space whereby the pressurized gases within the space may expand the longitudinally extending identation of the inner tubular member and displace the deformable, collapsed wall portion through the substantial fluid storage space to the outer tubular member to efficiently pressurize all the working fluid received in the storage space between the inner and outer members without allowing the pressurized gases to escape from the confinement space or mix with the working fluid pressurized.*

References Cited

The following references, cited by the Examiner, are of record in the patented file of this patent or the original patent.

UNITED STATES PATENTS

| | | | |
|---|---|---|---|
| 2,925,942 | 2/1960 | Schmidt et al. | 222—386.5 |
| 3,031,845 | 5/1962 | Ludwig | 60—26.1 |
| 3,091,923 | 6/1963 | Barnes | 222—386.5 |
| 3,097,766 | 7/1963 | Biehl et al. | 60—39.48 |
| 3,104,526 | 9/1963 | Hirschfeld et al. | 60—39.48 |
| 3,308,818 | 3/1967 | Rutkowski | 222—386.5 |

WENDELL E. BURNS, Primary Examiner

U.S. Cl. X.R.

222—386.5, 389